United States Patent
Filippov et al.

(10) Patent No.: US 8,973,408 B2
(45) Date of Patent: Mar. 10, 2015

(54) METHOD FOR PRODUCING OPTICAL FIBER USING LINEAR NON-CONTACT FIBER CENTERING

(75) Inventors: Andrey V Filippov, Painted Post, NY (US); Robert C Moore, Wilmington, NC (US); Bruce Warren Reding, Wilmington, NC (US); David Andrew Tucker, Wilmington, NC (US)

(73) Assignee: Corning Incorporated, Corning, NY (US)

(*) Notice: Subject to any disclaimer, the term of this patent is extended or adjusted under 35 U.S.C. 154(b) by 340 days.

(21) Appl. No.: 13/091,362

(22) Filed: Apr. 21, 2011

(65) Prior Publication Data

US 2011/0289980 A1 Dec. 1, 2011

Related U.S. Application Data

(60) Provisional application No. 61/348,893, filed on May 27, 2010.

(51) Int. Cl.
 *C03B 37/025* (2006.01)
 *C03B 37/027* (2006.01)
 *C03B 37/03* (2006.01)

(52) U.S. Cl.
 CPC ......... *C03B 37/02718* (2013.01); *C03B 37/032* (2013.01)
 USPC ............................................................ 65/435

(58) Field of Classification Search
 None
 See application file for complete search history.

(56) References Cited

U.S. PATENT DOCUMENTS

| | | | |
|---|---|---|---|
| 4,530,750 A | | 7/1985 | Aisenberg et al. |
| 5,284,499 A | * | 2/1994 | Harvey et al. .................. 65/435 |
| 6,125,638 A | * | 10/2000 | Ji et al. ............................. 62/63 |
| 6,715,323 B1 | | 4/2004 | Roba et al. |
| 2003/0101773 A1 | * | 6/2003 | Lu et al. ......................... 65/434 |
| 2009/0139270 A1 | | 6/2009 | Filippov et al. |

FOREIGN PATENT DOCUMENTS

| | | |
|---|---|---|
| DE | 3707969 | 9/1988 |
| EP | 493679 A2 * | 7/1992 |
| JP | 58009839 | 1/1983 |
| JP | 60065747 | 4/1985 |
| JP | 4240139 | 8/1992 |
| JP | 2000159536 | 6/2000 |
| JP | 2000247688 | 9/2000 |
| WO | 2008066661 | 6/2008 |

OTHER PUBLICATIONS

DE3707969, English Translation from U.S. Appl. No. 11/986,764, file date Aug. 2009.*
JP2000-247688 Machine Translation performed Jan. 24, 2013.*
JP58-009839 English Translation, FLS, Inc. Feb. 2013.*
JP2000-247688 English Translation, Phoenix Translations, Feb. 2013.*
U.S. Appl. No. 11/986,764, filed Nov. 26, 2007, Costello, John Joseph, II et al.
U.S. Appl. No. 11/998,366, filed Nov. 29, 2007, Filippov, Andrey V., et a.

* cited by examiner

*Primary Examiner* — Matthew Daniels
*Assistant Examiner* — Lisa Herring
(74) *Attorney, Agent, or Firm* — Robert L Carlson

(57) ABSTRACT

An optical fiber production system and method are provided for producing optical fiber. An optical fiber is drawn from a preform in a furnace and passes through a treatment device under a controlled reduced pressure or partial vacuum in the range of 0.01 to 0.8 atm. The treatment device cools the bare optical fiber as it cools to a temperature range of at least 1,600° C. to 1,300° C. A non-contact fiber centering device is located near an exit of the treatment device to provide linear centering of the optical fiber as it exits the treatment device.

20 Claims, 4 Drawing Sheets

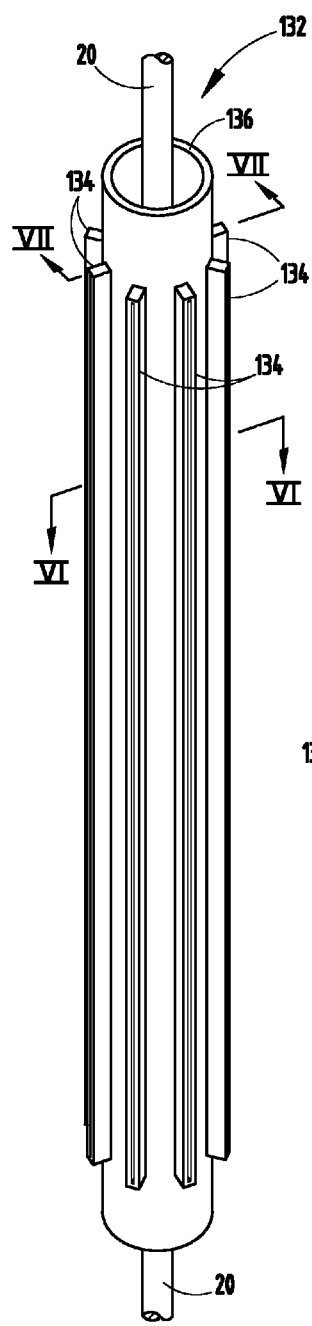
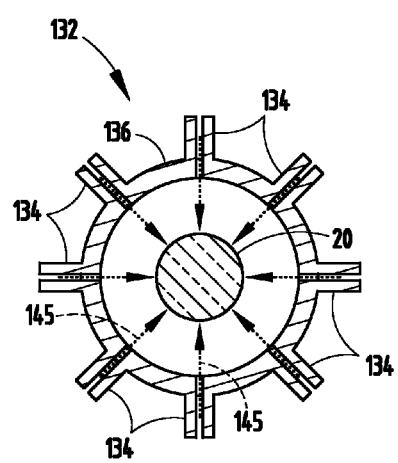
Figure 6
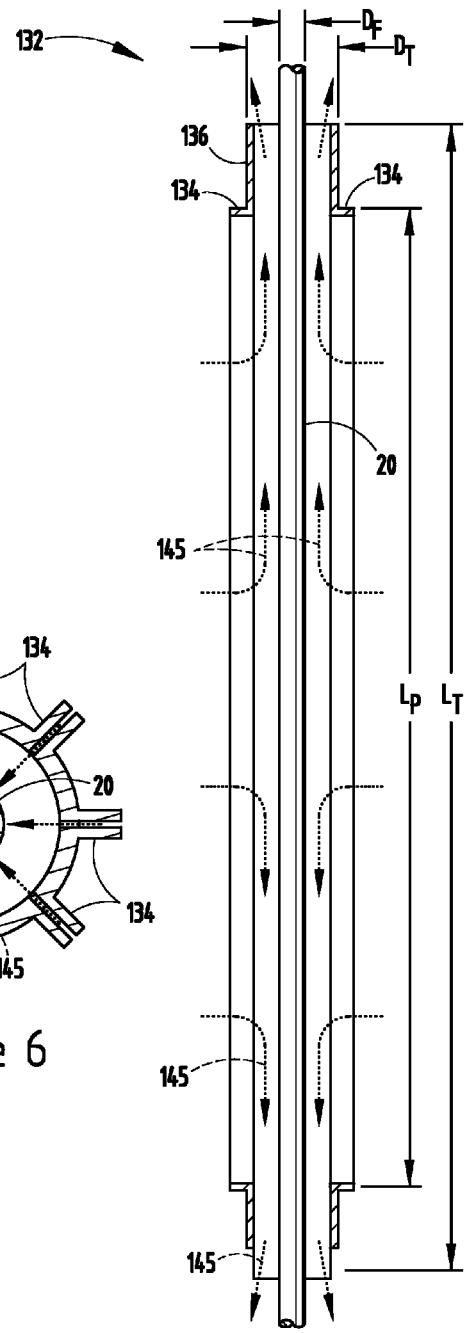
Figure 5
Figure 7

METHOD FOR PRODUCING OPTICAL FIBER USING LINEAR NON-CONTACT FIBER CENTERING

CROSS-REFERENCE TO RELATED APPLICATIONS

This application claims the benefit of priority under 35 U.S.C. §119(e) of U.S. Provisional Application Ser. No. 61/348,893, filed on May 27, 2010, the content of which is relied upon and incorporated herein by reference in its entirety.

BACKGROUND

The present invention generally relates to methods and apparatus for forming optical fibers and, more particularly relates to optical fiber production methods incorporating non-contact fiber centering.

Conventional manufacturing processes for producing optical fibers typically include drawing an optical fiber from an optical fiber preform in a draw furnace, cooling the drawn fiber, and coating the fiber after it is sufficiently cooled. The optical fiber is typically drawn in a furnace at about 2,000° C. and the heat is typically transported to the preform mostly by radiation.

SUMMARY

According to one embodiment, a method for producing an optical fiber is provided. The method includes the step of drawing a bare optical fiber from a preform in a furnace. The method also includes the step of centering the bare optical fiber downstream of the furnace with a linear non-contact centering device. The step of centering includes applying forced fluid onto the optical fiber to float the optical fiber. The method further includes the step of coating the bare optical fiber.

According to another embodiment, a method for producing an optical fiber is provided that includes the step of drawing a bare optical fiber from a preform in a furnace. The method also includes the step of centering the bare optical fiber downstream of the furnace with a linear non-contact centering device. The centering device comprises a channel defined by at least two tapered side walls for receiving forced fluid and the optical fiber. The fiber is retained and centered within a region of the channel having the force fluid which is sufficient to cause the fiber to be levitated within the channel substantially as a result of a pressure differential which is present below the fiber within the channel, wherein the side walls have an angle with respect to each other in the range of 10° to 60°.

According to a further embodiment, a method for producing an optical fiber is provided that includes the step of drawing a bare optical fiber from a preform in a furnace. The method also includes the step of pulling the bare optical fiber through a tube having a side walls defining a cylindrical opening and first and second ends. The method further includes the step of injecting high pressure fluid from a plurality of locations around a perimeter of the tube so as to maintain the optical fiber substantially in the center of the tube and prevent contact with the side wall of the tube.

According to yet a further embodiment, a linear non-contact fiber centering device is provided. The centering device comprises a channel having a region defined by at least two tapered side walls having an angle between the two side walls in the range of 10° to 60°. Fluid is forced in the region such that an optical fiber is retained within the region of channel and levitated within the channel substantially as a result of a pressure differential which is present below the fiber within the channel and wherein the fiber is self-located and centered within the channel.

According to yet a further embodiment, a linear non-contact fiber optic centering device is provided. The centering device includes a tube having a side wall defining a cylindrical opening and first and second ends for receiving an optical fiber. The centering device also includes a plurality of fluid injection ports radially located around a perimeter of the tube for directing high pressure fluid radially inward toward the optic fiber so as to maintain the optic fiber substantially centered within the tube and prevent contact with the side wall of the tube.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

FIG. 5 is a perspective view of a linear non-contact fiber centering device, according to a second embodiment;

FIG. 6 is a cross-sectional view of the linear non-contact fiber centering device taken through line VI-VI of FIG. 5; and FIG. 7 is a cross-sectional view of the fiber centering device taken through line VII-VII in FIG. 5.

DETAILED DESCRIPTION

Figure 1:
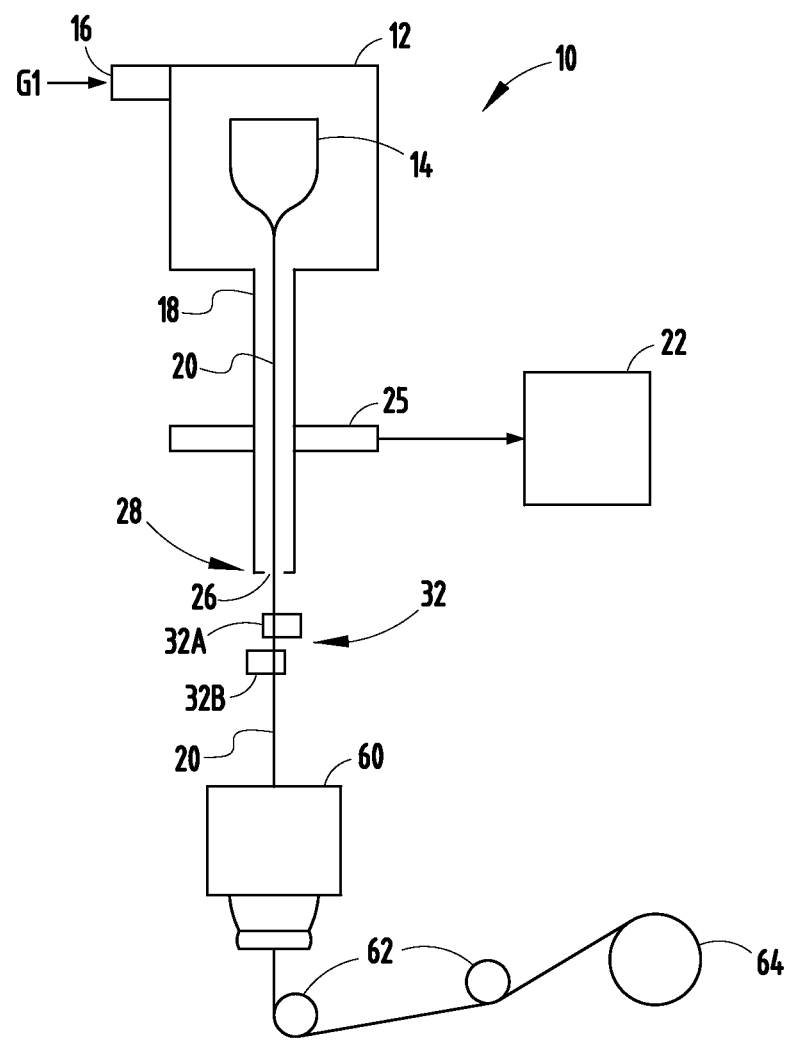
FIG. 1 is a schematic diagram illustrating an optical fiber production system employing a linear non-contact fiber centering device, according to one embodiment.

Reference will now be made in detail to the present preferred embodiments, examples of which are illustrated in the accompanying drawings. Whenever possible, the same reference numerals will be used throughout the drawings to refer to the same or like parts.

The optical fiber production system and method produces optical fibers through use of a furnace and fiber centering device. Embodiments of the optical fiber production system and method are herein described in connection with the drawing FIGS. 1-7, wherein like numbers indicate the same or corresponding elements throughout the drawings. The phrase "bare optical fiber" as used herein means an optical fiber directly drawn from a preform and prior to applying a protective coating layer to its outer surface (e.g., prior to the bare optical fiber being coated with a polymeric based material). The optical fiber production system and method allows for the formation of optical fiber with reduced defects using effective fiber centering techniques as disclosed herein.

Referring to FIG. 1, an optical fiber production system 10 is generally shown, according to one embodiment. The system 10 includes a furnace 12 that may be heated to a temperature of about 2,000° C. A glass optical fiber preform 14 is placed in the furnace 12 and fiber is drawn therefrom to create a bare optical fiber 20. The preform 14 may be constructed of any glass or material and may be doped suitable for the manufacture of optical fibers. Once the bare optical fiber 20 is drawn from the preform 14, the bare optical fiber 20 may be cooled in a slow-cooling treatment device 18 shown and described herein as a treatment tube according to one embodiment. The slow-cooling tube or treatment device 18 is shown integrally coupled to the exit of the furnace 12, according to one embodiment. However, it should be appreciated that treatment device 18 could otherwise be distanced from the furnace or otherwise connected thereto according to other embodiments.

As used herein, the term "treatment device" refers to the device downstream from the draw furnace 12 in which the bare optical fiber 20 is cooled at a rate that is slower than the cooling rate of the fiber in air at 25° C. and a pressure of 1 atm, and may include a tube as shown and described herein. The treatment device 18 may be connected to the output of furnace 12 so that it enters the treatment device 18 at a temperature between, for example, about 2,100° C. and 1,600° C. and cools the optical fiber 20 at a rate that is slower than the cooling rate of the fiber in air at 25° C. and a pressure of 1 atm. The fiber exits the treatment device 18 at a temperature preferably greater than 500° C. The fiber is preferably treated in the slow cooling treatment device for a time which is sufficient to result in a decrease in attenuation compared to a fiber of identical design which is not treated in the treatment device. For example, for optical fibers having less than 0.5 wt percent germanium oxide in the core (and also for fibers having cores which are free of germanium oxide), the fiber is preferably treated (slow cooled) within the treatment device during the time period that the fiber temperature is between 1,800° C. and 1,200° C., more preferably while the fiber temperature is between 1,700° C. and 1,200° C., and even more preferably while the fiber temperature is between 1,600° C. and 1,300° C. For optical fibers having greater than 0.5 wt percent germanium oxide in the core, the fiber is preferably treated (slow cooled) within the treatment device during the time period that the fiber temperature is between 1,600° C. and 900° C., more preferably while the fiber temperature is between 1,500° C. and 1,000° C., and even more preferably while the fiber temperature is between 1,400° C. and 1,000° C. However, because the treatment device utilizes lower than atmospheric pressures, these temperature ranges can be achieved in the treatment device while simultaneously adding an amount of heat which is less than the amount which would otherwise be added if the treatment device was at or above atmospheric pressure. The average cooling rate of the fiber in the treatment device 18 is defined as the fiber surface temperature at the entry point of the fiber into the treatment device 18 (the fiber entry surface temperature) minus the fiber's surface temperature at an exit point of the fiber out of the treatment device 18 (the fiber exit surface temperature) divided by the total residence time of the fiber in the treatment device 18.

The slow-cooling tube or treatment device 18 is shown having one or more pressure reducing or vacuum ports 25 connected to a vacuum pump 22. The vacuum pump 22 creates a reduced pressure or partial vacuum within the treatment device 18 and, in the embodiment shown, also creates a reduced pressure or a partial vacuum within the furnace 12 which is connected thereto. A single vacuum pump 22 is shown coupled to a single vacuum port 25 in the embodiment shown. However, it should be appreciated that one or more vacuum ports and/or one or more vacuum pumps may be employed to achieve the desired reduced pressure in one or more chambers of the treatment device 18 and/or furnace 12. The treatment device 18 advantageously is configured to cool the bare optical fiber 20 in a controlled environment as it passes from the furnace 12 through the outlet end 28.

In addition, a gas inlet 16 is shown for providing an inert gas, shown as G1, as an input to the furnace 12. The gas G1 may include argon, according to one embodiment, to reduce the amount of ambient air reaching the furnace 12. According to another embodiment, the inert gas may include nitrogen. It should be appreciated that more than one gas inlet may be employed at various locations of the furnace 12 and treatment device 18.

In the embodiment shown in FIG. 1, the bare optical fiber 20 drawn from preform 14 passes out through the bottom of the furnace 12, through the treatment device 18 out the exit orifice 26 at outlet end 28, and then passes through a centering device 32. Following the centering device 30, the bare optical fiber 20 may optionally further pass through one or more fluid bearings (not shown) which may shift the bare optical fiber 20 from moving along a substantially first or vertical pathway to a second pathway. The one or more fluid bearings may include fluid bearings disclosed in U.S. patent application Ser. No. 11/986,764, filed Nov. 26, 2007 (and provisionally filed as U.S. Patent Application No. 60/861,587) and U.S. patent application Ser. No. 11/998,366, filed Nov. 29, 2007, the disclosures of which are hereby incorporated herein by reference. After sufficient cooling, the bare optical fiber 20 is then subjected to a coating unit 60 where a primary protective coating layer is applied to the outer surface of the bare optical fiber 20. After leaving the coating unit 60 the optical fiber with a protective layer can pass through a variety of processing stages within the production system 10 such as tractors or rollers 62 and onto fiber storage spool 64. One of the rollers 62 may be used to provide the necessary tension on the optical fiber as it is drawn through the entire system and eventually wound onto a storage spool 64.

The optical fiber production system 10 utilizes a treatment device 18 at the output of the furnace 12 to cool the drawn bare optical fiber 20 at a desired cooling rate. The treatment device 18 has a long tube extending at one end from the furnace exit and has a small exit orifice 26 at the outlet end 28 at the opposite end through which the bare optical fiber 20 exits. The treatment device 18 may have a length in the range of 1 to 10 meters (m), more preferably in the range of 2 to 8 meters (m). In some embodiments, the tube 18 may be greater in length than 3 meters, 4 meters, and 5 meters. Having the treatment device 18 with a longer length allows for fiber to be drawn at faster speeds and still achieve the residence time necessary to achieve desired attenuation reduction. For example, significant attenuation reduction can be achieved in such devices while drawing the fiber at speeds greater than 20 meters/second, 25 meters/second and in some cases greater than 30 meters/second. For example, in one embodiment, the length of the treatment device is about 6 meters.

A linear non-contact fiber centering device 32 in close proximity to the outlet end 28 stabilizes the lateral XY position of the bare optical fiber 20 as it passes through the outlet end 28, and hence eliminates the possibility of the bare optical fiber 20 mechanically contacting the side wall of the orifice

36. The centering device 32 is a linear centering device that centers the fiber 20 as it passes along a straight line. As used herein, the term "linear" refers to a substantially straight line. The centering device 32 may be located within 1 meter from the exit orifice 26, and is preferably within 0.5 meters from the exit orifice 26, and more preferably within 20 centimeters, and most preferably within 15 centimeters. In one embodiment, the fiber entrance side of the centering device 32 (top of element 32A) is within the range of 2.54 centimeters (1.0 inch) to 15 centimeters (5.9 inches) of the exit orifice 26.

The interior of the furnace 12 and treatment device 18 is evacuated to a reduced pressure that is substantially lower than one atmosphere via vacuum pump 22. In the embodiment shown, the vacuum pump 22 evacuates gas at the vacuum port 25 located upstream of the tube exit. The reduced pressure provided by the vacuum pump 22 suppresses the time varying flows within the furnace 12, thereby eliminating the need to use helium to achieve a stable diameter fiber, and suppresses convective cooling of the bare optical fiber 20 in the tube 18, making the tube a slow-cooling device which improves the fiber attenuation. Ambient air ingress may be minimized by sealing the top of the furnace 12 and providing a small circular opening in the exit orifice 26 of the treatment device 18 to avoid the furnace degradation due to ambient air, specifically oxygen, entering the furnace. The size of the exit orifice 26 may be a diameter in the range of 0.5 mm to 5 mm, and may be more than four times greater than the diameter of the bare optical fiber 20. Residual air may be pulled in through the exit orifice 26 and may be discouraged from traveling up the tube 18 to the furnace 12 by injecting a low level flow of inert gas, such as argon, at the gas input 16 of the furnace 12 which flows to the evacuation port within the tube 18.

Ambient air that enters the treatment device 18 through exit orifice 26 enters the exit orifice 26 at a high speed that may be supersonic. The high speed air may cause the bare optical fiber 20 to vibrate and thus move laterally in the XY directions. Excessive lateral movement could cause the bare optical fiber 20 to contact the wall of the exit orifice 26, which may degrade the fiber strength and may interrupt the draw process. By employing the linear non-contact fiber centering device 32, the fiber 20 is stabilized in the lateral or XY directions in close proximity to the exit orifice 26. The centering device 32 is a linear non-contact device for centering the bare optical fiber 20 without mechanical contact. By mechanical contact, we mean contact with a solid component in the draw process.

The fiber production system 10 advantageously improves control of the fiber diameter and reduces the cooling speed by coupling the furnace 12 to the slow-cooling tube 18 and reducing the internal pressure of both while preventing contact of the bare optical fiber 20 with mechanical structures. The reduced pressure reduces the convective component of the heat transfer in the furnace 12 and improves the stability of the convection currents. The effect is that the heat transfer is more aperiodic and spatially uniform, which improves the fiber diameter control. Reduced pressure in the treatment device 18 reduces the cooling rate by decreasing the convective component of the cooling.

According to one embodiment, the reduced pressure in the furnace 12 and treatment device 18 may be in the range of 0.01 to 0.8 atm (7.6 to 608.0 torr). According to other embodiments, the reduced pressure may be in the range of 0.02 to 0.65 atm (15.2 to 494.0 torr), and more preferably, in the range of 0.05 to 0.50 atm (38.2 to 380.0 torr).

To achieve maximum optical loss reduction in the bare optical fiber 20, the cooling rate for temperatures between 1,600° C. and 1,300° C. should be no more than 5,000° C. per second, and more preferably is no more than 3,000° C. per second, and most preferably no more than about 2,000° C. per second, to permit the core to heal as many defects, or density fluctuations, as possible. At typical draw speeds, achieving this rate is facilitated by a treatment device 18 length of about six meters or more. It is desirable to cool the bare optical fiber 20 more quickly once it has reached 1,300° C. and thus the bare optical fiber 20 may leave the treatment device 18 at a temperature of less than 1,300° C., more preferably less than 1,200° C., and in some embodiments less than 1,100° C. The fiber 20 remains within the treatment device 18 for controlled cooling and exits the treatment device 18 at a temperature greater than 500° C., and may in some embodiments exit the treatment device 18 at a temperature of greater than 800° C. The exit orifice 26 at the outlet end 28 at the bottom of the treatment device 18 is close to the centering device 32 to ensure adequate centering of the bare optical fiber 20 within the exit orifice 26.

Figure 2:
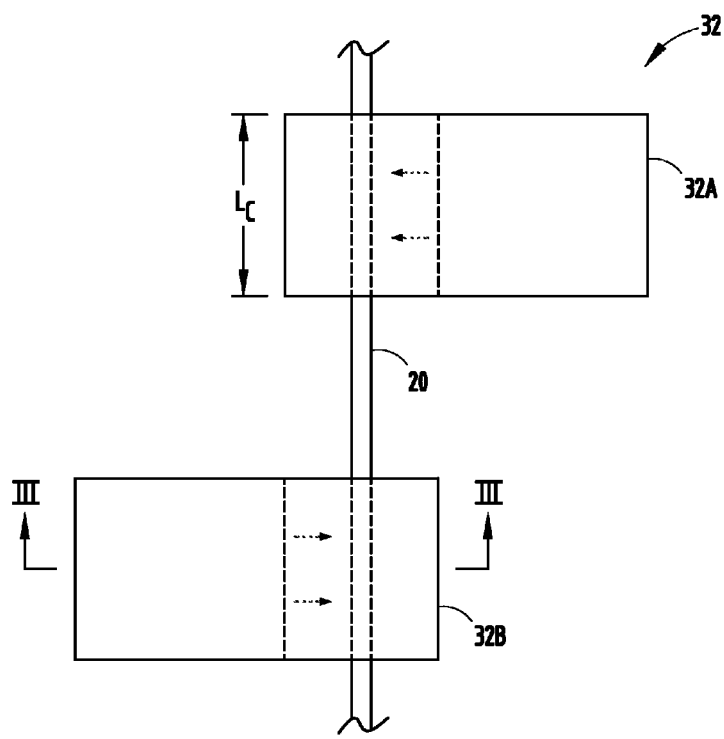
FIG. 2 is an enlarged schematic view of the linear non-contact fiber centering device for centering the fiber exiting the treatment device, according to a first embodiment.
Figure 3:
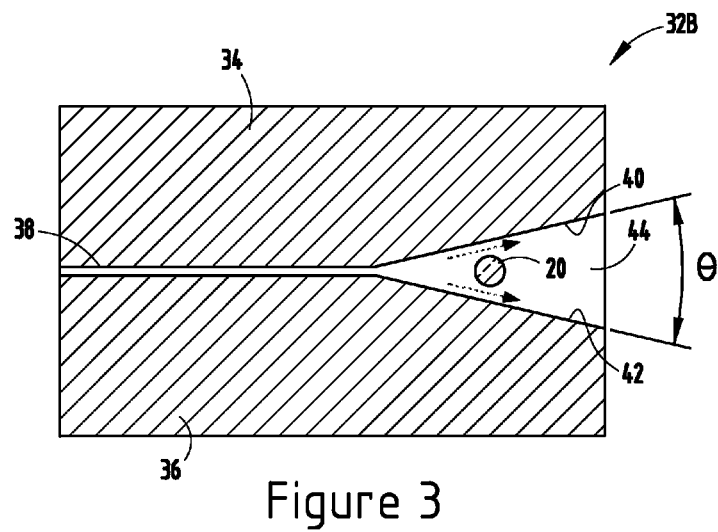
FIG. 3 is a cross-sectional side view of the fiber centering device taken through line III-III of FIG. 2.
Figure 4:
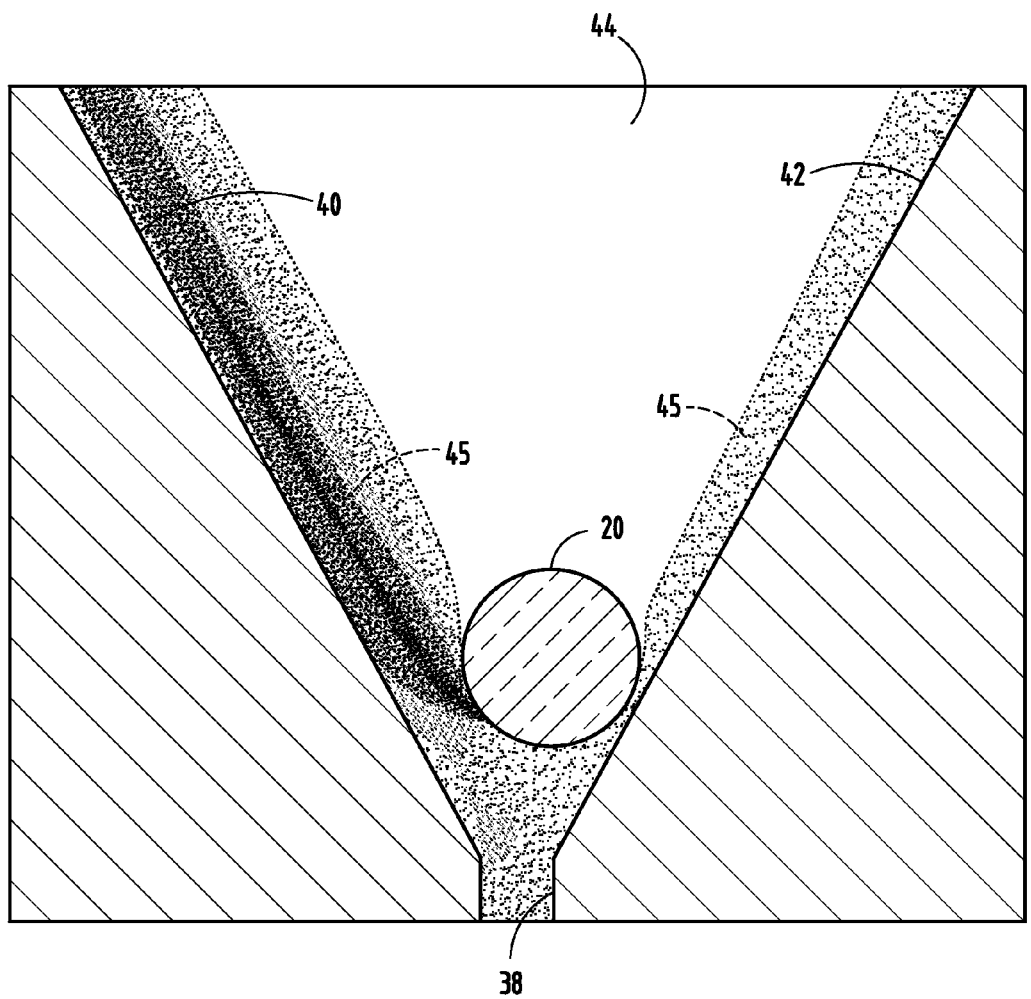
FIG. 4 is an enlarged sectional view of the fiber centering device shown in FIG. 3 further illustrating air flow relative to the fiber.

The linear non-contact optical fiber centering device 32 is further illustrated in FIGS. 2-4, according to a first embodiment. The centering device 32 is shown in FIG. 2 having a first linear centering element 32A for centering the bare optical fiber 20 on one side and a second linear centering element 32B for centering the bare optical fiber 20 on the opposite side. Each of the first and second centering elements 32A and 32B has a high pressure fluid (air) channel 38 leading to a wedge shaped channel 44 as shown in FIG. 3. The wedge-shaped channel 44 has opposite angled side walls that result in a wall-to-wall full angle θ in the range of 10° to 60°, according to one embodiment, which is equivalent to a half angle of 5° to 30° relative to a horizontal line in FIG. 3. According to another embodiment, the wedge-shaped channel 44 has angled side walls that result in a full angle θ therebetween in the range of 1° to 60°, more preferably 10° to 60°, and most preferably 40° to 60°. According to a further embodiment, the full angle θ is in the range of 1° to 10°. The bare optical fiber 20 is suspended within the wedge-shaped channel 44 by high pressure fluid in the form of compressed air exiting from a fluid delivery channel 38 through wedge-shaped channel 44. In doing so, gas, such as compressed air 45, supplied by an air jet and through delivery channel 38 forcibly flows on both sides of the bare optical fiber 20 as seen in FIG. 4 to form a fluid bearing or air cushion that suspends the bare optical fiber 20 in a manner that prevents mechanical contact with any structure of the centering device 32 and its elements 32A and 32B. The fluid, such as compressed gaseous air, is forced under pressure through delivery channel 38 and exhausted out the wedge-shaped channel 44 such that the bare optical fiber 20 is retained under draw tension within the region of the wedge-shaped channel 44 and levitated within the wedge-shaped channel 44 substantially as a result of a pressure differential which is present below the fiber 20 within the wedge-shaped channel 44. As a result, the fiber 20 is self-located and centered within the wedge-shaped channel 44.

As seen in FIG. 3, the individual centering elements 32A and 32B may each be made up of a first side member 34 and a second side member 36. The air delivery channel 38 may be formed as a slot at the interface of members 34 and 36. The first side member 34 has an angled wall 40 and the second side member 36 has an angled wall 42 that together form the wedge-shaped channel 44 leading from the air channel 38. The slot of air delivery channel 38 and wedge-shaped channel 44 have a depth or length that defines the effective length $L_C$ of the air cushion applied to the fiber 20. It should be appreciated that while centering element 32B is shown in FIG. 3, that centering element 32A may be identically formed, but is shown in FIG. 2 oriented at 180° relative to element 32B.

Each of the first and second centering elements 32A and 32B provides linear or straightened segments for centering the bare optical fiber 20 located in an expanding volume channel 44 with high speed air flowing from the outlet of delivery channel 38 at the vertex of wedge-shaped channel 44 to the ambient environment. The speed of the air applied to the fiber 20 may be in the range of 25 meters/second (m/s) to 500 m/s, according to one embodiment. The length of the fiber element $L_C$ subjected to centering by either centering elements 32A or 32B can be between several millimeters and several centimeters, such as in the range of 0.5 cm to 100 centimeters, and more preferably 0.5 centimeters to 10 centimeters, and most preferably 0.5 centimeters to 2 centimeters, for example. The centering elements 32A and 32B produce a strong centering force on the wall-to-wall direction, but only a lift force in the other direction, thereby forcing the bare optical fiber 20 away from the exit of the air channel 38. By combining two or more pairs of linear centering elements 32A and 32B as shown, the combination allows the bare optical fiber 20 centering in opposite lateral directions, with little or no effect of fiber tension variation. If there is a need to increase the centering force, more than one pair of linear centering elements 32A and 32B can be used in a sequence, with each following pair turned anywhere between 0° and 180° around the bare optical fiber 20 in respect to the prior pair, in order to make the centering effect less dependent on the direction.

A linear non-contact optical fiber centering device 132 is shown in FIGS. 5 through 7, according to a second embodiment. Centering device 132 may be used as an alternative to centering device 32 shown in FIG. 1 to center the bare optical fiber 20 exiting treatment device 18, or may be used elsewhere in the optical fiber production system 10 to center optical fiber. In this embodiment, a centering tube element 136 is employed to achieve a very low angular dependence of the centering force. The tube 136 has a side wall defining a cylindrical opening and first and second opposite ends for receiving and exiting the bare optical fiber 20. In addition, the centering device 132 includes a plurality of fluid injection ports 134 radially located around a perimeter of the side walls of the tube 136 and adapted to connect in fluid communication with air jets for directing high pressure fluid, such as air 145, radially inward toward the bare optical fiber 20 so as to maintain the optical fiber 20 substantially centered within the tube 136 and prevent mechanical contact with the side wall of the tube 136.

In the embodiment shown, the fluid injection ports 134 with air jets (not shown) include at least eight equiangularly spaced fluid injection ports 134. In this embodiment, the bare optical fiber 20 may be situated inside the straight circular tube 136 with a diameter between one and twenty times greater than the fiber diameter $D_F$. According to one embodiment, the tube 136 may have a circular cross section inside diameter less than 1 millimeter which works well with a bare optical fiber 20 having an outer diameter of about 125 microns. In one embodiment, the ratio of the inside diameter $D_T$ of the tube 136 to the outside diameter $D_F$ of the fiber 20 is less than 20:1, and more preferably of less than 10:1. There may be several slot holes or ports 134 in the tube 136 along its axis, allowing the series of air jet flows entering the gap between the fiber 20 and the inner tube wall 136. Displacement of the fiber 20 may change the air flow 145 in the tube 136, which generally results in a centering force with both pressure and friction components, thereby centering the bare optical fiber 20 within the tube 136. The tube 136 may have a length $L_T$ such as less than 50 cm, and more preferably less than 25 cm, according to one embodiment. The fluid injection ports 134 may have a length $L_P$ less than 90 percent of the tube length $L_T$.

It should be appreciated that the linear non-contact optical centering devices 32 and 132 advantageously center the bare optical fiber 20 leaving the exit orifice 26 of the treatment device 18 so as to prevent mechanical contact of the bare optical fiber 20 with the wall of the exit orifice 26 or other structure(s), according to one embodiment. It should be appreciated that the linear non-contact optical centering device 32 or 132 may be employed in other locations within the optical fiber production system 10 to center the bare optical fiber 20. Additionally, it should be appreciated that the forced air used for centering the bare optical fiber 20 provides for an increased cooling rate of the optical fiber 20 as it passes through the centering device 32 or 132, following its controlled cooling in the treatment device 18. Downstream from the centering device 32 or 132, the optical fiber 20 may pass through one or more fluid bearings, and may be coated by a coating unit, before being drawn by a draw mechanism and wound on a spool.

It will be apparent to those skilled in the art that various modifications and variations can be made without departing from the spirit or scope of the claims.

What is claimed is:

1. A method for producing an optical fiber, said method comprising the steps of:
    drawing a bare optical fiber from a preform in a furnace;
    reducing pressure in at least one of the furnace and a treatment device such that the pressure in the at least one of the furnace and treatment device is in the range of 0.01 to 0.40 atm;
    centering the bare optical fiber downstream of the at least one of the furnace and the treatment device, said centering achieved with at least two linear non-contact centering devices, one of said at least two linear non-contact centering devices located on one side of said bare optical fiber, the other of said at least two linear non-contact centering devices located on the other side of said bare optical fiber, said step of centering including applying forced fluid onto the bare optical fiber, wherein the centering devices comprise a channel having a region defined by at least two tapered side walls having an angle between the two tapered side walls in the range of 10° to 60°, wherein the fluid is forced in the region such that the bare optical fiber is retained within the region of the channel and levitated within the channel substantially as a result of a pressure differential which is present below the bare optical fiber within the channel; and
    coating the bare optical fiber.

2. The method of claim 1, wherein each of the linear non-contact centering devices comprise first and second centering elements, and the step of centering the bare optical fiber comprises applying fluid in each of the first and second liquid non-contact centering devices in opposite directions.

3. The method of claim 1, wherein the step of applying forced fluid comprises applying forced air.

4. The method of claim 3, wherein the furnace comprises the treatment device, wherein the at least two linear non-contact centering devices are located near an exit of the treatment device.

5. The method of claim 1, wherein the centering devices are located below an exit of the furnace from with the bare optical fiber is drawn so as to center the bare optical fiber exiting the furnace.

6. The method of claim 1, wherein the pressure is in the range of 0.02 to 0.30 atm.

7. The method of claim 1, wherein the pressure is in the range of 0.05 to 0.20 atm.

8. The method of claim 1, wherein the at least two linear non-contact centering devices are located within one meter from an exit orifice of the at least one of the furnace and the treatment device.

9. The method of claim 8, wherein the exit orifice has a diameter in the range of 0.5 millimeters to 5.0 millimeters.

10. The method of claim 1, wherein the step of reducing pressure in at least one of the furnace and the treatment device occurs absent any helium gas.

11. A method of producing an optical fiber, said method comprising the steps of:
drawing a bare optical fiber from a preform in a furnace; and
reducing pressure in at least one of the furnace and a treatment device such that the pressure in the at least one of the furnace and treatment device is in the range of 0.01 to 0.40 atm;
centering the bare optical fiber downstream of the at least one of the furnace and the treatment device, said centering achieved with at least two linear non-contact centering devices, one of said at least two linear non-contact centering devices located on one side of said fiber, the other of said at least two linear non-contact centering devices located on the other side of said fiber, each of said at least two linear non-contact centering devices comprising a linear channel defined by at least two tapered side walls for receiving forced fluid and the bare optical fiber, wherein the bare optical fiber is retained and centered within a region of said linear channel having the forced fluid which is sufficient to cause the bare optical fiber to be levitated within the linear channel substantially as a result of a pressure differential which is present below the bare optical fiber within the linear channel, wherein the two tapered side walls have an angle with respect to each other in the range of 10° to 60°.

12. The method of claim 11, wherein the centering devices are located near an exit of the furnace to center the optical fiber exiting the furnace.

13. The method of claim 12, wherein the furnace comprises the treatment device, wherein the centering devices are located near an exit of the treatment device.

14. The method of claim 11, wherein the forced fluid comprises a gas.

15. The method of claim 11, wherein each of the linear non-contact centering devices comprise first and second centering elements and the step of centering the bare optical fiber comprises applying fluid in each of the first and second non-contact centering elements in opposite directions.

16. The method of claim 11, wherein the pressure is in the range of 0.02 to 0.30 atm.

17. The method of claim 11, wherein the pressure is in the range of 0.05 to 0.20 atm.

18. The method of claim 11, wherein the at least two linear non-contact centering devices are located within one meter from an exit orifice of the at least one of the furnace and the treatment device.

19. The method of claim 18, wherein the exit orifice has a diameter in the range of 0.5 millimeters to 5.0 millimeters.

20. The method of claim 11, wherein the step of reducing pressure in at least one of the furnace and the treatment device occurs absent any helium gas.

* * * * *